United States Patent [19]
Piacente et al.

[11] 3,798,381
[45] Mar. 19, 1974

[54] INHIBITING TRUNK CALLS FROM PRIVATE BRANCH EXCHANGES

[75] Inventors: Luigi Piacente; Giovanni Gandolfi, both of Milan, Italy

[73] Assignee: Societa' Italiana Telecomunicazioni S.p.A., Milan, Italy

[22] Filed: Nov. 8, 1971

[21] Appl. No.: 196,318

[30] Foreign Application Priority Data
Nov. 9, 1970 Italy ................................ 31483/70

[52] U.S. Cl. ........................................ 179/18 DA
[51] Int. Cl. ........................................ H04m 1/66
[58] Field of Search .................... 179/18 DA, 27 CB

[56] References Cited
UNITED STATES PATENTS

| | | | |
|---|---|---|---|
| 3,553,382 | 1/1971 | Knox et al. | 179/18 DA |
| 3,569,634 | 3/1971 | Amadesi et al. | 179/18 DA |
| 3,671,677 | 6/1972 | Lee et al. | 179/18 DA |

*Primary Examiner*—William C. Cooper
*Attorney, Agent, or Firm*—Karl F. Ross; Herbert Dubno

[57] ABSTRACT

To prevent the unauthorized initiation of toll calls from a local telephone station served by a private branch exchange (PBX), the latter is equipped with monitoring circuitry working into a binary/decimal counter which is activated during the dialing of an initial digit (or combination of digits) and, in response to one or more predetermined values thereof, trips a flip-flop to disconnect the station from the line. The flip-flop is also tripped if dialing is commenced before reception of a dial tone from the central office, or if dialing is continued after the arrival of a second a-c signal (line free or busy) from that office. To forestall the generation of a spurious dial tone by voice frequencies. the a-c path from the local station to the PBX is opened during dialing.

12 Claims, 5 Drawing Figures

LUIGI PIACENTE
GIOVANNI GANDOLFI
INVENTORS.

BY Karl F. Ross
Attorney

LUIGI PIACENTE
GIOVANNI GANDOLFI
INVENTORS.

BY

Karl G. Ross
Attorney

LUIGI PIACENTE
GIOVANNI GANDOLFI
INVENTORS.

BY

Karl F. Ross
Attorney

Luigi Piacente
Giovanni Gandolfi
INVENTOR.

BY Karl F. Ross
Attorney

LUIGI PIACENTE
GIOVANNI GANDOLFI
INVENTORS.

BY

Karl F. Ross
Attorney

INHIBITING TRUNK CALLS FROM PRIVATE BRANCH EXCHANGES

This application is related to our copending U.S. Pat. application Ser. No. 186,692 filed Oct. 5, 1971, now U.S. Pat. No. 3,749,847.

Our present invention relates to a device for inhibiting the initiation of certain outgoing calls, such as toll calls, from a subscriber station of a telecommunication system, more particularly from a local station connected to an extension of a private branch exchange or PBX.

The automation of telephony enables the initiation of toll calls from a subscriber station without the intervention of an operator at either a PBX or a central office. In many instances, however, such toll calls must not be allowed to go through without the knowledge of the PBX operator; in many hotels, for example, the quests are not permitted to make long-distance calls by direct dialing.

In our above-identified copending application we have disclosed and claimed a foolproof and tamperproof device for preventing the initiation of toll calls (or, in an extreme case, of any outgoing calls) from a station accessible to persons not authorized to make such calls.

The general object of the instant invention is to provide a fundamentally similar device to be used in a PBX, rather than on the telephone set of an individual subscriber station.

As in the earlier case, it is also an object of our invention to provide a purely electronic system, without wear-prone movable parts, which can be selectively adapted to inhibit any type of outgoing call characterized by a predetermined numerical value of a specified digit or group of digits of a call number.

Whereas a caller at an individual subscriber station can seize a line to the central office merely by lifting the receiver, the user of a local station served by a PBX may first have to press a button or to dial a preliminary digit (e.g. "9" or "0") in order to extend the signal path beyond the PBX. This preliminary digit is not part of the call number and will therefore not be further considered in the ensuing description.

In the United States, toll calls are generally initiated by the dialing of an area code containing a "0" or a "1" as its second digit. In some localities, this area code is preceded by an initial digit "1." In other countries, long-distance calls require the initial dialing of a "0."

The system disclosed in our prior application comprises essentially an electronic pulse counter in combination with monitoring circuitry connected across a subscriber line for detecting dial pulses generated by periodic opening and closing of a line loop, this circuitry including pulse-repeating or pulse-shaping means for producing trains of stepping pulses in the rhythm of the dial pulses and, with the aid of an integrating network, for deriving from each pulse train an individual digital pulse which enables the counter, through the intermediary of a control circuit responsive to these digital pulses, to receive the stepping pulses pertaining to a particular digit. If this digit has a predetermined numerical value, or one of several such values (e.g. "0" or "1"), the output lead of the counter trips an electronic switch such as a flip-flop to place a shunt across the dial or other call selector at the subscriber station so as to prevent effective open-circuiting of the line loop and to attenuate the dial pulses transmitted over the line to the central office.

Experience has shown that prior attempts at policing outgoing calls with the aid of a pulse counter are sometimes frustrated by manipulating the selector and the hook switch of the telephone set in a manner avoiding the reception of a dial tone from the central office or exchange before the first pulse is dialed, thereby aborting the operation of a call inhibitor normally alerted by such dial tone. In accordance with a further feature of our earlier disclosure, therefore, we have provided an alternating-current detector whose output is fed, together with the stepping pulses from the pulse shaper, to a discriminator which trips the dial-shunting switch independently of the counter if no dial tone is present prior to the generation of the first stepping pulse.

Even so, voice frequencies reaching the line over an electro-acoustic transducer, such as the microphone of a telephone handset, could be picked up by the *a–c* detector and cause a malfunction of the discriminator. For this reason, still another feature disclosed in the copending application resides in the provision of a disabling circuit for the transducer effective under the control of the pulse shaper in the presence of stepping pulses, the transducer being reactivated by the *a–c* detector in the presence of line signals (dial tone, busy signal or ringing current) from the central office.

In accordance with the present invention, the monitoring circuitry referred to above is located at the PBX for operation under the control of pulsing means, such as a relay, adapted to open and close an outgoing line leading to the central office. Upon the actuation of this pulsing relay by means of a dial or equivalent call selector at the local station, a pulse-separating network in this circuitry delivers its stepping pulses and its digital pulses to respective counters which in turn work into an evaluation network designed to emit an inhibition signal upon establishing a prohibited correlation between the number of stepping pulses in a digital train and the numerical order of the corresponding digit in the selected call number. If this prohibited correlation is found to exist, a switch controlled by the evaluation network effectively decouples the local station from the PBX in response to the generated inhibition signal.

The decoupling switch advantageously comprises a relay controlled by a flip-flop; as this and other relays herein referred to intervene only once or twice in any call, they can be provided with electromagnetically actuated armatures, yet they may of course also be of the contactless electronic type.

In principle, the decoupling switch at the PBX could operate in the manner disclosed in our prior application, i.e., by placing a shunt across the line loop to attenuate the generated dial pulses. In a preferred embodiment described in detail hereinafter, however, this switch is simply a relay which open-circuits the signal path between the PBX and the affiliated station.

Pursuant to a further feature of our invention, a differentiation circuit forming part of the monitoring network at the PBX generates a seizure pulse upon initation of an outgoing call and a release pulse upon termination thereof. The seizure pulse resets the flip-flop controlling the decoupling switch, if that flip-flop had previously been set by an output from the pulse-counting circuit, whereas the release pulse sets another flip-flop whose function it is to block the operation of the pulse counter upon determination of a permissible relationship inconsistent with the prohibited one between the number of stepping pulses and the numerical order of the digit or combination of digits monitored. This determination is made by a pair of gating circuits forming part of the evaluation network, each of these two gating circuits comprising one or more coincidence (such as AND, NAND or NOR) gates depending upon the number of initial digits to be tested. Advantageously, if the monitored portion of the call number consists of two or more initial digits, the binary digit counter works into a corresponding number of decoding stages each connected to an input of a respective coincidence gate in the second gating circuit, i.e., the one which controls the counter-blocking flip-flop, the other inputs of these gates being connected to certain output leads of the pulse-counting circuit in such a way as to set this flip-flop immediately upon the detection of any transmitted digit whose value is inconsistent with the prohibited combination. A single coincidence gate will suffice for the first gating circuit, i.e., the one controlling the decoupling switch, since this switch should be tripped only upon verification of the fact that the value of the last digit of that group corresponds to a forbidden code.

Another feature of our present system is the provision of a detector for alternating-current signals from the central office, generally similar to the detector disclosed in our prior application, which together with the pulse-repeating circuit feeds a discriminator designed to ascertain the presence of a line signal from the central office prior to the generation of the first stepping pulse. (The line signals here considered include dial tone as well as busy and ringing signals, normally distinguishable only by somewhat uncertain parameters such as rhythm or frequency which we prefer not to rely upon as criteria for the operation of our call-inhibiting device.) If the caller starts dialing without waiting for the line signal, possibly in an attempt to beat the system, the decoupling switch is operated independently of the evaluation network.

In some telecommunication systems, the appearance of a busy signal after the dialing of all or part of a call number enables the caller to restart dialing without restoring the receiver. In such a system, therefore, a user could try to make an unauthorized toll call by first dialing a permitted local number (possibly a nonexisting one) and, on receiving a second line signal after completing his selection, restarting the dialing process with the prohibited combination which at that stage is no longer recognized as such since the pulse counter has been blocked. To avoid this mode of fraudulent operation, our improved system advantageously includes a signal counter working into a detector which, with a count of line signals greater than one, operates the decoupling switch in the presence of one or more further stepping pulses emitted from the pulse-repeating circuit. This signal counter may form part of the connection between the *a–c* detector and the discriminator which determines the relative priority of dial tone and first digital pulse. Furthermore, a bistable circuit or flip-flop serving to step the signal counter may operate a further relay to interrupt the *a–c* path between the PBX and the local station so as to prevent the transmission of voice frequencies thereover before or during dialing; this flip-flop may be settable by the seizure pulse generated upon the lifting of the receiver, as well as by a reading pulse occurring at the end of each train of stepping pulses, and may be resettable together with the blocking flip-flop by the output of the *a–c* detector so as to advance the signal counter in response to any line signal preceded by an open-loop condition. The reading pulse, along with a slightly delayed zero-setting pulse for the pulse counter, is generated by the aforementioned differentiation circuit which responds to variations in the average line potential (as distinct from short-term variations due to dial pulses or transients).

The above and other features of our invention will be described in detail hereinafter with reference to the accompanying drawing in which.

Figure 1:
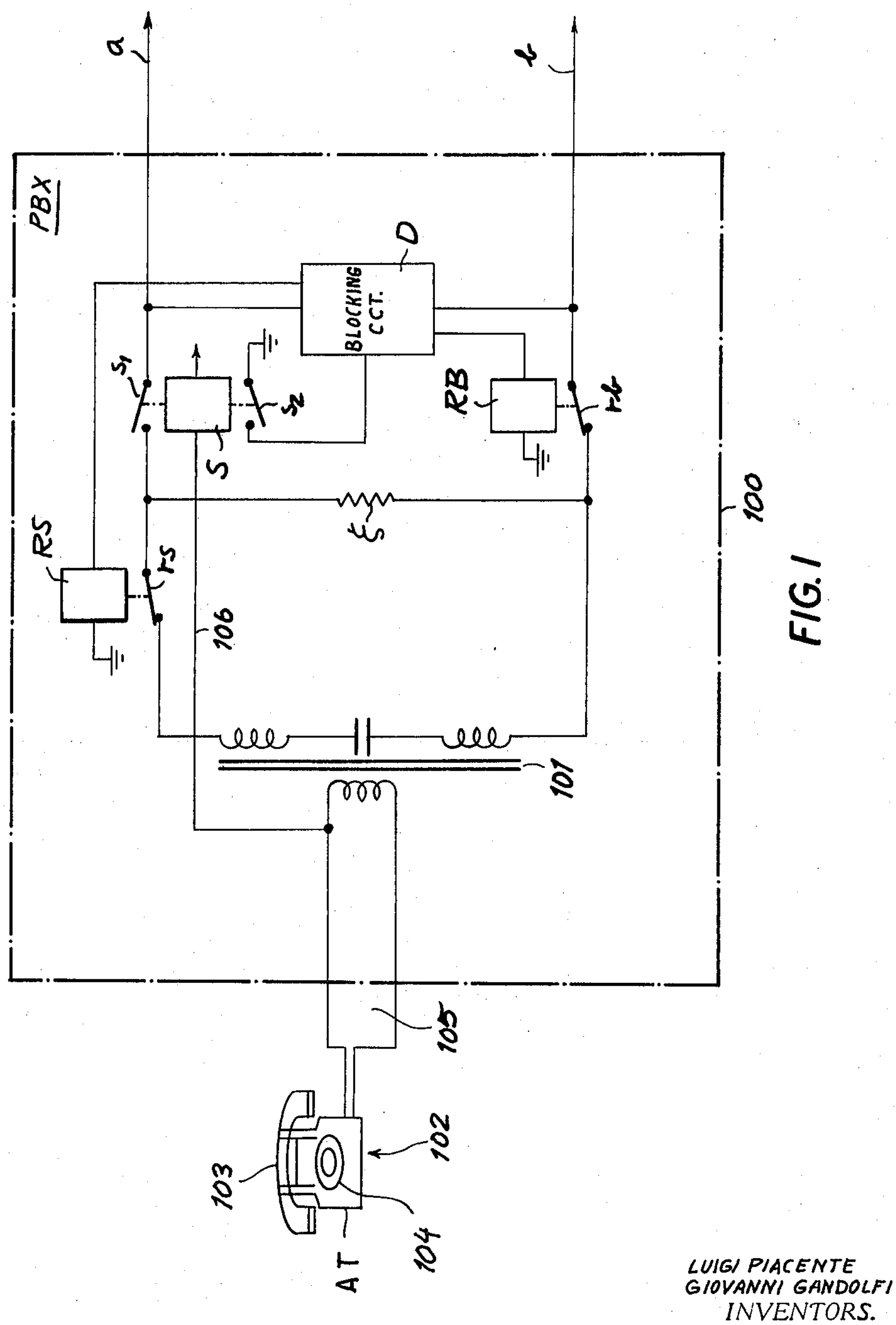
FIG. 1 is a highly diagrammatic overall view of a local station and an associated private branch exchange equipped with a call-inhibiting device according to our invention.

The system shown in FIG. 1 includes a private branch exchange (PBX), designated 100, having access to a remote central office via an outgoing line *a*, *b* terminating in a transformer 101. A local station 102, including a conventional telephone set AT provided with a receiver 103 and a dial 104, is linked with the PBX 100 through a line 105; it will be understood that this connection is not permanent but is established, on an outgoing call initiated by the user of set AT, with the aid of nonillustrated switches or connectors operated automatically or manually in response to a request signal from station 102.

Figure 2:
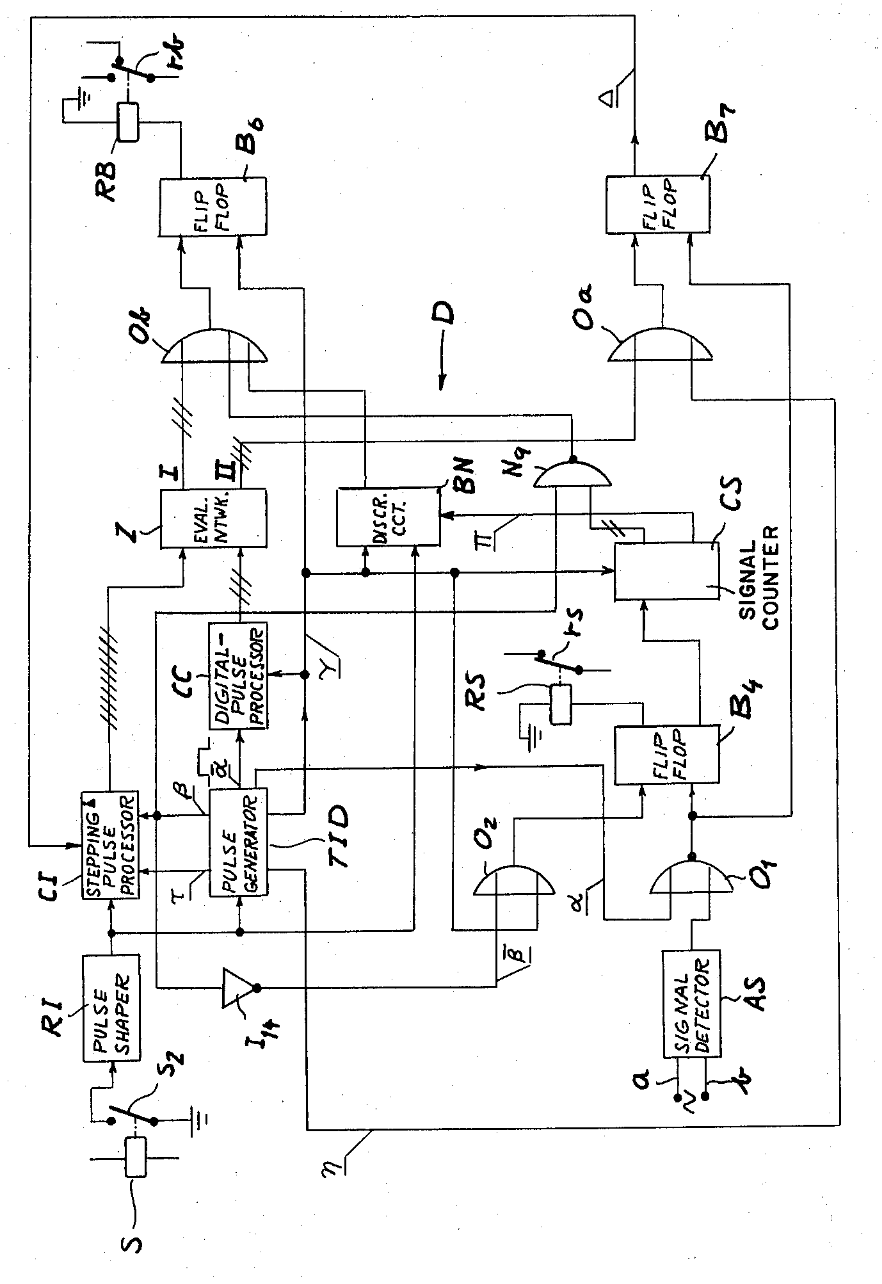
FIG. 2 is a block diagram of the device shown in FIG. 1.
Figure 3:
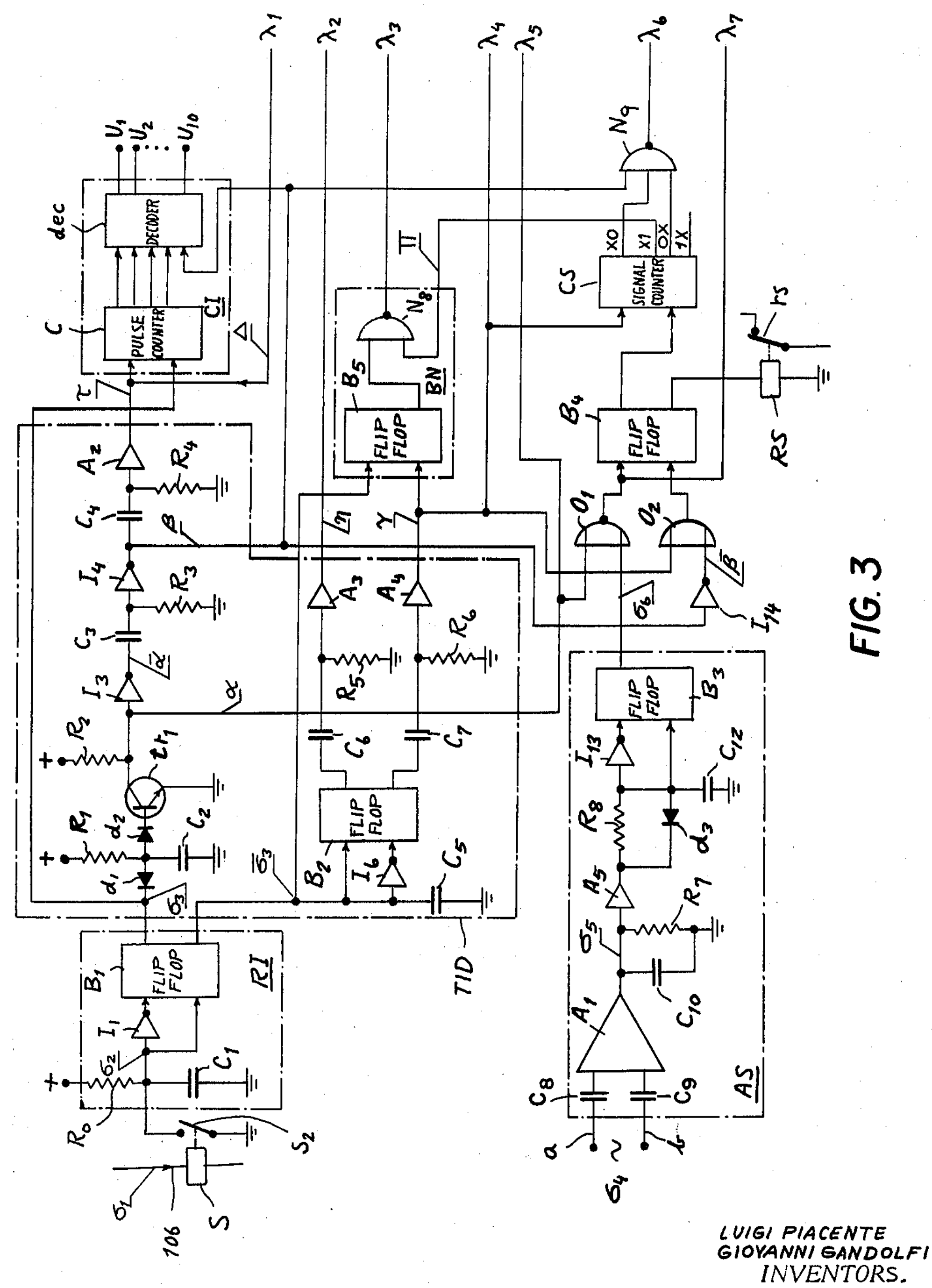
FIGS. 3 and 4 are more detailed circuit diagrams of the components illustrated in FIG. 2.
Figure 4:
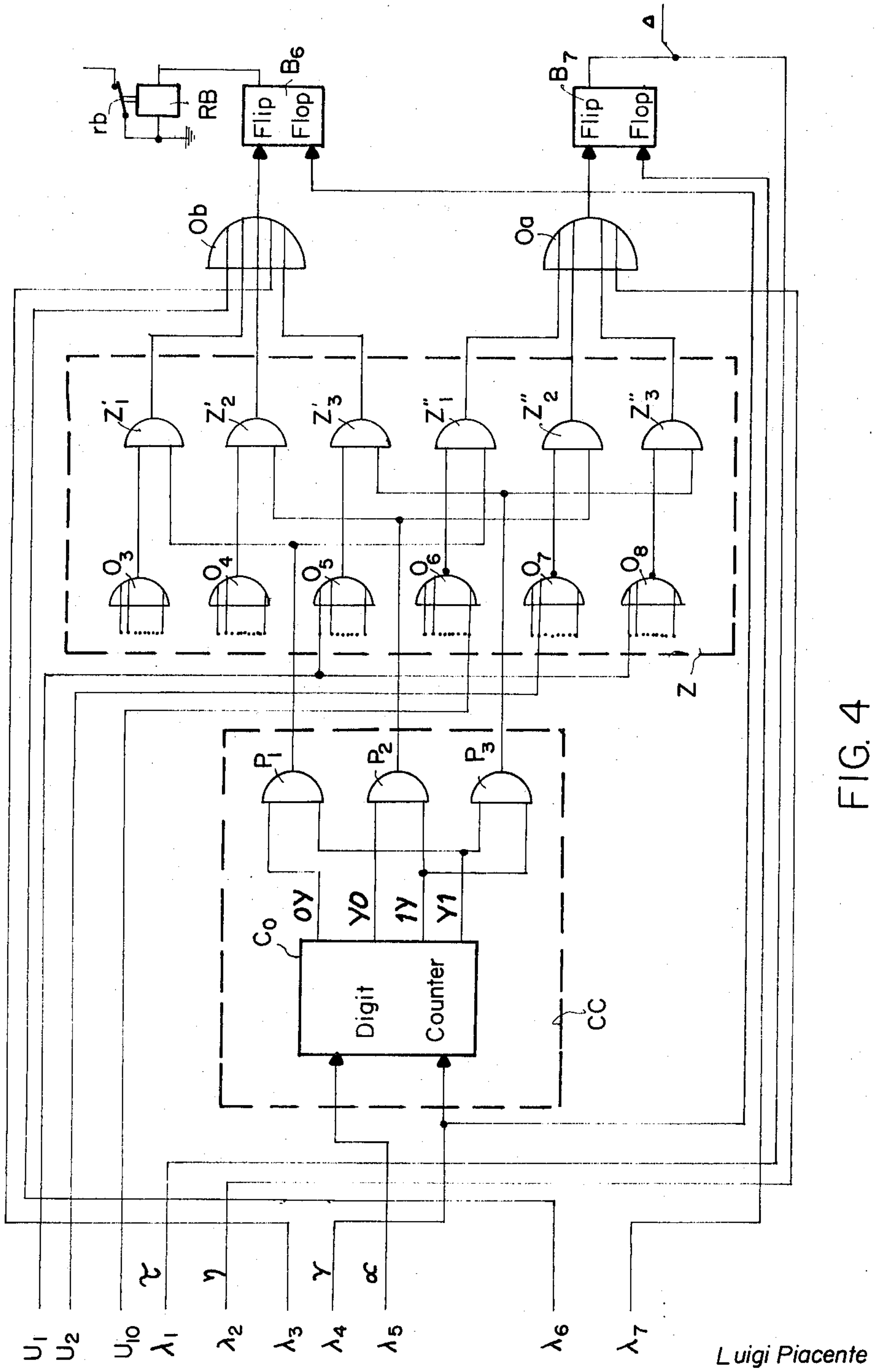

A call-inhibiting device D, more fully described hereinafter with reference to FIGS. 2 – 4, is connected across conductors *a*, *b* to receive the alternating-current signals (dial tone, busy signal or ringing current) from the central office. In the case of an outgoing call, the line loop constituted by these conductors and transformer 101 is closed or opened by an armature $s_1$ of a relay S energizable via a lead 106 under the control of the dial 104 and the handset-operated hook switch of the set AT as is well known per se. Armature $s_1$ is inserted in conductor *a* between its junction with unit D and a shunt impedance $\epsilon$ paralleling the transformer 101. Armatures *rs* and *rb* of two further relays RS and RB are also inserted in the line loop; both relays RS and RB are operable under the control of device D during the attempted establishment of an outgoing call as more fully described hereinafter.

Relay S, which translates the selected digits into trains of dial pulses transmitted to the central office by periodic opening and closing of the line loop, is also shown provided with a second armature $s_2$ repeating these dial pulses (along with the closure and the opening of the line loop upon initiation and termination of a call) to the device D.

According to FIG. 2, device D comprises a pulse shaper RI whose input includes the armature $s_2$ of relay S and which together with that relay constitutes a pulse-repeating stage forming part of the monitoring circuitry which checks on the destination of the outgoing call initiated at station 102. Pulse shaper RI emits a train of stepping pulses, in the rhythm of the outgoing dial pulse, which are processed in a counting stage CI whose output circuit (consisting of ten leads as schematically indicated in FIG. 2 and more fully illustrated in FIG. 3) feeds an evaluation network Z. The output voltage of circuit RI, which varies in step with the *d–c* potential of the line loop shown in FIG. 1, is also communicated to a pulse generator TID which, by integration and differentiation, derives therefrom a seizure pulse $\lambda$ upon initial closure of the line loop, a release pulse $\eta$ upon the final opening thereof, a series of digital pulses $\alpha$ each representing a train of closely spaced stepping pulses, a reading pulse $\beta$ at the end of each digital pulse $\alpha$, and a zero-setting pulse $\tau$ following the reading pulse $\beta$ with a slight delay. The inverted pulses $\bar{\alpha}$ are transmitted to a processor CC whose output circuit, with a number of leads (here 3) corresponding to the number of initial digits to be monitored, also feeds the evaluating network Z. This network has two multilead outputs I and II whose energization, in the presence of either a prohibited or a permissible code combination, sets either a flip-flop $B_6$ or a flip-flop $B_7$ by way of a respective OR gate O*b* or O*a*. Flip-flop $B_6$, when set, operates the relays RB to open the line loop at its armature *rb* as illustrated in FIG. 1, thereby effectively decoupling the calling station 102 from the outgoing line *a*, *b*. Flip-flop $B_7$, when set, emits a blocking signal $\Delta$ which is fed back to the stepping-pulse processor CI to stop the counting of these pulses. Flip-flop $B_6$ is reset by pulse $\lambda$ whereas flip-flop $B_7$ can be set by pulse $\eta$ through OR gate O*a*.

The alternating-current signals arriving over line *a*, *b* are picked up by a detector stage AS working into an input of a NOR gate $O_1$ also receiving the original digital pulses $\alpha$ from generator TID. The output of this NOR gate is fed to a setting input of a further flip-flop $B_4$ and, in parallel therewith, to the resetting input of flip-flop $B_7$. Flip-flop $B_4$ is settable by the seizure pulse $\lambda$, as well as by the complement $\bar{\beta}$ of reading pulse $\beta$ obtained from an inverter $I_{14}$, by way of an OR gate $O_2$. When thus set, this flip-flop operates the relay RS to open the line loop at armature *rs* thereof. On being reset, flip-flop $B_4$ steps a signal counter CS which is resettable to zero by the seizure signal $\lambda$ and whose several output leads (two in this specific example) terminate at a decoder in the form of a NAND gate $N_9$ which also receives the reading pulse $\beta$ from network TID and which works into a further input of OR gate O*b*. Still another input of this OR gate is energizable by a discriminating circuit BN which has a first input receiving the seizure pulse $\lambda$ from network TID, a second input receiving the stepping pulses from circuit RI, and a third input receiving a dial-tone-confirmation signal $\tau$ generated by counter CS in an advanced position thereof.

Briefly, the operation of the device D shown in FIGS. 1 and 2 is as follows:

When a caller lifts the handset 103 off the hook, relay S is actuated to close the line loop and to energize the input of pulse shaper RI, thereby generating the seizure pulse $\lambda$. This pulse sets the flip-flop $B_4$ and restores to normal the components $B_6$, CC and CS, if they had previously been actuated, thereby conditioning the system for response to a dial tone expected from the central office. If this dial tone arrives before the first digit is dialed, i.e., before stepping pulses begin to appear in the output of stage RI, discriminator BN is maintained inactive by the confirmation signal $\pi$ as the counter CS takes one step under the control of flip-flop $B_4$ in response to the incoming line signal. The resetting of flip-flop $B_4$ by that line signal releases the relay RS which had opened the *a–c* path between transformer 101 and the holding impedance $\epsilon$, the latter preserving the continuity of the line loop to a sufficient degree to avoid the transmission of a spurius dial pulse to the central office. As the selection of the call digits proceeds, counting stage CI registers the numerical value of each selected digit; the pulse $\bar{\alpha}$ appearing concurrently in the output of generator TID advances the counting stage CC one step per digit. The contents of counter CI are read out at the end of each digit, by the pulse $\beta$, to the evaluation network Z also receiving the reading of counting stage CC. If the two readings establish a prohibited relationship, as if the second digit is found to have the value "0" or "1" indicative of a toll call, network Z energizes one of its output leads I to trip the flip-flop $B_6$, thereby operating the relay RB to disconnect the local station 102 from the central office. It should be noted that this decoupling operation does not affect the condition of relay S which holds up until the caller puts down the handset 103. Thereafter, the normal call-initiating condition is restored if the caller at station 102 takes the receiver off the hook before being cut off from lead 106 or on being reconnected thereto, or if another local station associated with PBX 100 is given access to the outgoing line. In each case the prolonged opening and subsequent reclosure of contact $s_2$ gives rise to another seizure pulse $\lambda$ which resets the flip-flop $B_6$ so as to release the relay RB.

If the call number selected by the user of station 102 does not start with a prohibited digit or combination of digits, network Z energizes one of its output leads II to set the flip-flop $B_7$; the resulting blocking signal $\Delta$ then returns the counting stage CI to zero (the same as pulse $\tau$) and prevents its advance so that network Z can no longer intervene during the remainder of the dialing process. Upon termination of the call, pulse $\eta$ sets the flip-flop $B_7$ in preparation for the next outgoing call, if necessary.

If, however, the caller does not await the arrival of a dial tone from the central office but starts the selection prematurely, signal $\pi$ is absent at the time the first stepping pulse reaches the discriminator BN; the latter thereupon sets the flip-flop $B_6$ via OR gate O*b*, with resulting operation of decoupling relay RB to the same effect as described above.

A similar decoupling action reults from an attempt to recommence dialing upon reception of a second line signal (e.g. a busy tone) from the central office after a preceding selection of a nonprohibited call number. In that case the counter CS de-energizes the corresponding two inputs of NAND gate $N_9$ whose third input is momentarily de-energized by the occurrence of reading pulse $\beta$ so that this gate emits a pulse to OR gate O*b* for again setting the flip-flop $B_6$.

The specific mode of operation of the units discussed in connection with FIG. 2 will now be described with reference to FIGS. 3, 4 and 5.

Figure 5:
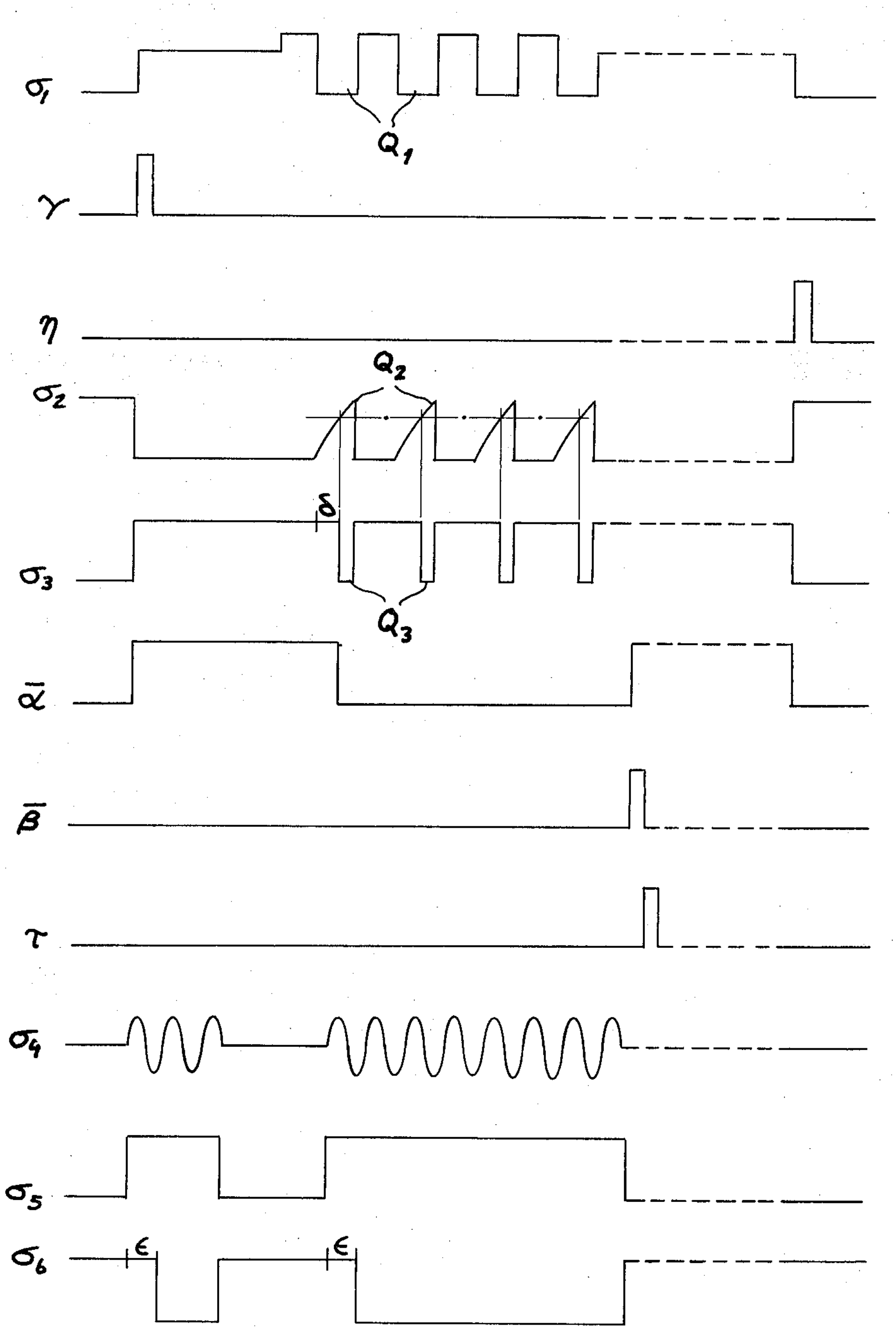
FIG. 5 is a set of graphs serving to explain the operation of the system of FIGS. 1 – 4.

In FIG. 5 we have shown an input signal $\sigma_1$ fed by the lead 106 to relay S and repeated by the latter to pulse shaper RI. This circuit, as illustrated in FIG. 3, includes a flip-flop $B_1$ with its setting and resetting inputs tied to the junction of a capacitor $C_1$ with a resistor $R_o$ connected to positive potential; an inverter $I_1$ is inserted between the setting input and that junction which is grounded by armature $s_2$ whenever relay S is operated. Capacitor $C_1$ thereby develops a voltage $\sigma_2$ which is generally a mirror image of voltage $\sigma_1$, except for the leading edges of its positive pulses $Q_2$ which rise more gradually than the corresponding flanks of the negative dial pulses $Q_1$ forming part of the signal $\sigma_1$. When the leading edge of a pulse $Q_2$ reaches the switching threshold of flip-flop $B_1$, after a delay $\delta$ indicated in the fifth graph of FIG. 5, a stepping pulse $Q_3$ is generated in the output of that flip-flop as part of a signal $\sigma_3$. Thus, the leading edge of each pulse $Q_3$ is offset from that of the generating dial pulse $Q_1$ by the interval $\delta$ whereas the trailing edges of the pulses $Q_1$ and $Q_3$ coincide with each other and also with that of pulse $Q_2$. The delay $\delta$ prevents the flip-flop $B_1$ from responding to spurious signals or transients, thereby protecting the device D against malfunction.

Pulse generator TID comprises an integrating circuit including a capacitor $C_2$, a pair of oppositely poled diodes $d_1$, $d_2$, and a clamping resistor $R_1$ connected to positive potential. The negative stepping pulses $Q_3$ of signal $\sigma_3$, passed by diode $d_1$, rapidly discharge the capacitor $C_2$ which therefore delivers, for as long as these pulses persist, a near-ground potential to the base of an NPN transistor $tr_1$ whose emitter is grounded and whose collector is connected to positive potential through a further resistor $R_2$. The collector potential of this transistor constitutes the series of digital pulses $\alpha$ whose complement $\bar{\alpha}$ , obtained through an inverter $I_3$, is shown in FIG. 5. The latter signal is differentiated in a circuit $C_3$, $R_3$ and inverted at $I_4$ to yield the reading pulse $\beta$ whose complement $\bar{\beta}$ , illustrated in FIG. 5, is applied to OR gate $O_2$ by inverter $I_{14}$. Pulse $\beta$ , aside from being fed to NAND gate $N_9$ and to a decoder dec in pulse-counting stage CI, is further differentiated in a circuit $C_4$, $R_4$ to generate, as a delayed replica, the zero-setting pulse $\tau$ which is amplified at $A_2$ and reaches a resetting input of a pulse counter C in stage CI; a stepping input of counter C is connected directly to the set output of flip-flop $B_1$ to receive from it the signal $\sigma_3$.

The complementary signal $\bar{\sigma}_3$, appearing at the reset output of this flip-flop, is delivered directly to a resetting input of a flip-flop $B_2$ and through an inverter $I_6$ to a setting input thereof; the reset and set outputs of flip-flop $B_2$ work into respective differentiation circuits $C_6$, $R_5$ and $C_7$, $R_6$ to generate the release and seizure pulses $\eta$ and $\lambda$ which are amplified at $A_3$ and $A_4$, respectively. Transients in the input of flip-flop $B_2$ are shunted to ground by a condenser $C_5$ corresponding to the capacitor $C_1$ in the input of flip-flop $B_1$; these input circuits are similar to a protective circuit disclosed in our prior application identified above.

The discriminating network BN includes a flip-flop $B_5$ working into a NAND gate $N_8$ whose second input receives the dial-tone-confirmation signal $\pi$ from the counter CS. This counter, which in the embodiment here discussed is designed to count the first three digits of a call number, has two binary stages with three active output leads designated X0, X1 and 0X. In its zero position (binary value "00"), leads X0 and 0X are energized, both these leads terminating at NAND gate $N_9$. On taking the first step, counter CS energizes lead X1 in lieu of lead X0, thus indicating the binary value "01"; it is this lead X1 that carries the confirmation signal $\pi$ . A second advance of the counter de-energizes the lead 0X and energizes instead an inactive lead 1X shown only for explanatory purposes.

Counter C of unit CI has four binary stages with respective output leads extending to binary/decimal decoder dec, the latter being provided with ten output leads $U_1$, $U_2$, . . . $U_{10}$. These output leads, however, are normally grounded and are individually energizable only in the presence of reading pulse $\beta$ applied to an enabling input of the decoder. As is well known, the subscript of the energized output lead corresponds to the number of stepping pulses received by the counter C before the arrival of the reading pulse; when the counter is reset by the pulse $\tau$ , all its output leads are de-energized.

The central-office signals appearing on line $a$, $b$ have been designated $\sigma_4$ in FIGS. 3 and 5. These signals, passed by blocking condensers $C_8$ and $C_9$, traverse an amplifier $A_1$ which suppresses their negative half-cycles and delivers their positive pulsations to an integrating circuit including a capacitor $C_{10}$ shunted by a resistor $R_7$. The voltage developed across the capacitor $C_{10}$ is a square wave $\sigma_5$ which is further amplified at $A_5$ and fed to a flip-flop $B_3$ by way of a protective circuit, similar to those described in conjunction with flip-flops $B_1$ and $B_2$, comprising a storage condenser $C_{12}$, a charging resistor $R_8$ therefor and a diode $d_3$ in parallel with that resistor. The time constant of the circuit $R_8$, $C_{12}$ produces a delay $\epsilon$ in the leading edges of the negative pulses of a generally mirror-symmetrical square wave $\sigma_6$ appearing in the reset output of flip-flop $B_3$ whose resetting input is connected to the ungrounded terminal of capacitor $C_{12}$ through an inverter $I_{13}$; the setting input of flip-flop $B_3$ is directly tied to this terminal whereby signal $\sigma_6$ goes positive whenever a positive pulse of signal $\sigma_5$ has charged the capacitor $C_{12}$ to the threshold potential of this flip-flop.

The circuits shown in FIG. 3 are connected to those of FIG. 4 by the ten output leads $U_1$ - $U_{10}$ of decoder dec and by seven further leads $\lambda_1$ – $\lambda_7$. Lead $\lambda_1$, originating at flip-flop $B_7$ and carrying the blocking signal $\Delta$ thereof in the set state of this flip-flop, is joined to the resetting input of counter C in circuit CI. Lead $\lambda_2$, conducting the release pulse $\eta$, extends from amplifier $A_3$ to OR gate O$a$. Lead $\lambda_3$ feeds the output of NAND gate $N_8$ to OR gate O$b$. Lead $\lambda_4$ carries the seizure pulse $\lambda$ to a resetting input of a counter $C_o$ in unit CC; branches of this lead also extend to one of the inputs of OR gate $O_2$ and to the setting input of flip-flop $B_5$ whose resetting input receives the signal $\sigma_3$ from flip-flop $B_1$. Lead $\lambda_5$ transmits the digital pulses $\alpha$ to a stepping input of counter $C_o$. Lead $\lambda_6$ carries the output of NAND gate $N_9$ to another input of OR gate O$b$. Lead $\lambda_7$ extends from the output of NOR gate $O_1$ to the resetting input of flip-flop $B_7$.

Digit counter $C_o$ is similar to signal counter CS and has four analogous output leads designated 0Y, Y0, 1Y and Y1. leads 0Y and Y1 extend to respective inputs of an AND gate $P_1$ which therefore operates whenever the counter $C_o$ has taken one step from its zero position to which it is reset by the pulse $\lambda$ at the beginning of a call and which is characterized by the simultaneous energization of leads 0Y and Y0. A second AND gate $P_2$ is connected to output leads Y0 and 1Y to respond to step No. 2. Output leads 1Y and Y1 open a third AND gate $P_3$ on the next step.

Evaluation network Z comprises a set of OR gates $O_3$, $O_4$, $O_5$ and a set of NOR gates $O_6$, $O_7$, $O_8$ working into respective AND gates $Z'_1$, $Z'_2$, $Z'_3$ and $Z''_1$, $Z''_2$, $Z''_3$. Corresponding AND gates $Z'_1$ and $Z''_1$ have their second inputs connected to the output of gate $P_1$; in like manner, gates $P_2$ and $P_3$ feed associated gate pairs $Z'_2$, $Z''_2$ and $Z'_3$, $Z''_3$. Gates $Z'_1 - Z'_3$ have their outputs extended to OR gate O*b* whereas gates $Z''_1 - Z''_3$ supply the OR gate O*a*.

Let us assume that the system shown in FIGS. 2–4 is designed to inhibit the initiation of calls to a particular area identified by the initial digits "021." Output leads $U_1$, $U_2$ and $U_{10}$ of counting stage CI are connected to respective inputs of NOR gates $O_6$, $O_7$, $O_8$ so that these gates conduct whenever a digit other than the one so designated is dialed. OR gates $O_3$ and $O_4$ are not utilized but are provided only in case it is desired to stop a call characterized by a particular first or second digit. OR gate $O_5$ has an input connected to output lead $U_1$ of stage CI. As will be apparent, more than one input of any of these OR and NOR gates may be connected to a respective output lead of counting stage CI if several digits or digit combinations are in the prohibited class. According to the number of inadmissible numerical values per digit, some of the OR gates may be replaced by NOR gates (and vice versa) with suitable change in wiring.

When the caller picks up the handset, pulse $\lambda$ is generated and, through OR gate $O_2$, sets the flip-flop $B_4$ so that relay RS is operated and opens the *a–c* path at its armature *s*. Flip-flops $B_5$ and $B_6$ as well as counters CS and $C_o$ are reset, if necessary, by this pulse.

If the caller properly awaits the arrival of a dial tone before beginning his selection, flip-flop $B_3$ is tripped and generates the first negative pulse of signal $\sigma_6$, thereby de-energizing one of the inputs of NOR gate $O_1$ whose other input is concurrently de-energized by the absence of a digital pulse $\alpha$. NOR gate $O_1$ therefore conducts and resets the flip-flop $B_4$ which releases the relay RS and advances the counter CS by one step. This operation removes voltage from one of the two outputs, i.e., lead X0, extending from that counter to NAND gate $N_9$. At the same time, the energization of lead X1 makes the NAND gate $N_8$ in discriminator BN insensitive to a subsequent setting of flip-flop $B_5$ upon the disappearance of signal $\sigma_3$ in the presence of a stepping pulse $Q_3$ (see FIG. 5). Thus, neither of the two input leads $\lambda_3$ and $\lambda_6$ of OR gate O*b* is energized at this instant.

The caller now proceeds to dial the first digit. If this digit has any value other than "0," NOR gate $O_6$ remains conductive upon the generation of the first reading pulse $\beta$ and causes the energization of the output lead of AND gate $Z''_1$ since the first digital pulse $\alpha$ has stepped the counter $C_o$ to open the AND gate $P_1$. As a result, flip-flop $B_7$ generates the blocking signal $\Delta$ which clamps the pulse counter C in its zero position and prevents any further operation of units CI and Z. If, however, the first pulse does have the value "0," neither flip-flop $B_6$, $B_7$ operates in response to the first reading pulse $\beta$ and counter C is temporarily reset by the pulse $\tau$ to renew its advance upon the dialing of the second digit. If that digit has a value other than "2," NOR gate $O_7$ conducts and sets the flip-flop $B_7$ via AND gate $Z''_2$ and OR gate O*a* after the counter $C_o$ has taken its second step to unblock the gate $P_2$; again, such operation would result in the blocking of counting stage CI. If, on the other hand, the second digit does have the value "2," counter C is again reset by the pulse $\tau$ following the second reading pulse $\beta$.

If, now, the third digit has the value "1" to complete the prohibited combination "021," OR gate $O_5$ conducts whereas OR gate $O_8$ is cut off; thus, with AND gate $P_3$ open in the No. 3 position of counter $C_o$, flip-flop $B_6$ is set by way of OR gate O*b* and operates the relay R*b* to decouple the local station 102 from the remote central office. With any other value of the third digit, NOR gate $O_8$ operates the AND gate $Z''_3$ to set the flip-flop $B_7$ and generate the blocking pulse $\Delta$.

It should be noted that, on the appearance of the first reading pulse $\beta$, its inversion $\bar{\beta}$ sets the flip-flop $B_4$ to reoperate the relay RS. This flip-flop is then reset only by the recurrence of a line signal $\sigma_4$ upon termination of dialing, NOR gate $O_1$ responding in the same manner as during initiation of the call. With flip-flop $B_4$ reset a second time, signal counter CS takes another step so as to de-energize its lead 0X; if a further reading pulse $\beta$ should be generated thereafter, NAND gate $N_9$ would conduct and set the flip-flop $B_6$ by way of lead $\mu_6$ and OR gate O*b*. If the caller started dialing before the arrival of a line signal at detector AS, the setting of flip-flop $B_5$ in the absence of confirmation signal $\pi$ would unblock the NAND gate $N_8$ to set the flip-flop $B_6$ by way of lead $\lambda_3$ and OR gate O*b*. In either of these cases, therefore, dialing would be stopped in order to prevent improper manipulation of the type discussed above.

We claim:

1. A device for preventing the initiation of certain outgoing calls, characterized by a predetermined numerical value of at least one specified call-number digit, from a local station served by a private branch exchange connected via an outgoing line to a central office of a telecommunication system, comprising:

pulsing means at said branch exchange responsive to a call selector at said station for periodically opening and closing a line loop between said branch exchange and said central office to transmit successive digits over said line;

monitoring circuitry at said branch exchange controlled by said pulsing means and including pulse-repeating means for generating trains of stepping pulses in the rhythm of dial pulses emitted by said call selector and integrating means connected to said pulse-repeating means for deriving an individual digital pulse from any such train of stepping pulses;

electronic pulse-counting means connected to said pulse-repeating means for receiving said stepping pulses therefrom, said pulse-counting means having an output circuit with at least one output lead electrically marked in response to a predetermined number of consecutive stepping pulses;

digit-counting means connected to said integrating means for receiving said digital pulses therefrom and ascertaining the numerical order of a transmitted digit represented by any train of stepping pulses;

evaluation means connected to both said pulse-counting means and said digit-counting means for emitting an inhibition signal upon establishing a prohibited correlation between said predetermined number and the numerical order of the transmitted digit, said evaluation means being further connected to said monitoring circuitry for actuation by a reading pulse generated at the end of each digital pulse, said pulse-counting means being connected to said monitoring means for resetting by a zero-setting pulse following said reading pulse with a predetermined delay; and switch means controlled by said evaluation means for effectively decoupling said station from said line in response to said inhibition signal.

2. A device as defined in claim 1 wherein said evaluation means comprises a first and a second gating circuit each provided with input connections to both said pulse-counting means and said digit-counting means, said first gating circuit having an output connection to said switch means, further comprising blocking means controlled by said second gating circuit for deactivating said pulse-counting means upon ascertainment of a relationship inconsistent with said prohibited correlation between said predetermined number and the numerical order of the selected digit.

3. A device as defined in claim 2 wherein said monitoring circuitry comprises differentiation means connected to said pulse-repeating means for generating a variety of pulses upon substantial variations in the average potential of said line, including a seizure pulse upon initial closure of the line loop and a release pulse upon final opening thereof, said switch means comprising a first flip-flop settable by said output connection and coupled to said differentiation means for resetting by said seizure pulse, said blocking means comprising a second flip-flop settable by said second gating circuit and coupled to said integrating means for resetting in the absence of a digital pulse.

4. A device as defined in claim 3 wherein said digit-counting means comprises a plurality of decoding stages and wherein said second gating circuit comprises a like plurality of coincidence gates connected on the one hand to the output circuit of said pulse-counting means and on the other hand to respective decoding stages for successive enablement thereby upon the occurrence of consecutive digits in an initial portion of a call number, said first gating circuit including at least one coincidence gate connected to said output circuit and one of said decoding stages for enablement thereby upon the occurrence of the last digit of said initial portion.

5. A device as defined in claim 4 wherein said output circuit comprises ten output leads connected to be individually energized in conformity with the number of stepping pulses in a train identifying a selected digit, certain of said output leads being connected to the coincidence gates of said second gating circuit for ascertaining said inconsistent relationship upon selection af any digit of said initial portion, at least one of said output leads being connected to the coincidence gate of said first gating circuit for establishing said prohibited correlation upon selection of said last digit.

6. A device as defined in claim 3 wherein said monitoring circuitry further includes a detector for alternating-current signals from said central office and discriminating means controlled by said detector and by said pulse-repeating means for determining the presence of a line signal from said central office prior to generation of the first stepping pulse and, in the absence of such line signal, for operating said switch means independently of said evaluation means.

7. A device as defined in claim 6 wherein said pulse-repeating means, said differentiation means and said detector are provided with respective protective circuits for suppressing transients in the inputs thereof.

8. A device as defined in claim 6 wherein said monitoring circuitry further comprises bistable means coupled to said differentiation means for setting by said seizure and reading pulses and coupled to said detector for resetting in the presence of a line signal, further comprising signal-counting means connected to said bistable means for advancement by any line signal preceded by an open-loop condition, said detector controlling said discriminatory means through said bistable means and signal-counting means.

9. A device as defined in claim 8, further comprising circuit-breaker means controlled by said bistable means in the set state thereof for effectively decoupling said station from said central office.

10. A device as defined in claim 7, further comprising gate means inserted between said bistable means and said detector and provided with an input connection to said integrating means for preventing any resetting of said bistable means by a line signal in the presence of a digital pulse, said second flip-flop being connected to said integrating means by way of said gate means.

11. A device as defined in claim 7 wherein said signal-counting means includes a decoder connected to said differentiation means for receiving said reading pulse therefrom, said decoder being effective with a count of line signals greater than one to operate said switch means upon generation of a further stepping pulse subsequently to a recurring line signal, said signal-counting means being connected to said differentiation means for restoration to zero by said seizure pulse.

12. A device as defined in claim 7 wherein said pulse-counting means is connected to said differentiation means for restoration to a starting condition by said zero-setting pulse.

* * * * *